United States Patent
Franke

(10) Patent No.: US 8,303,324 B2
(45) Date of Patent: Nov. 6, 2012

(54) RECEIVING UNIT FOR A CIRCUIT BOARD CARRIER, CONNECTION SYSTEM, ELECTRIC MACHINE WITH RECEIVING UNIT AND MOTOR VEHICLE WITH SUCH AN ELECTRIC MACHINE

(75) Inventor: Torsten Franke, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/072,081

(22) Filed: Mar. 25, 2011

(65) Prior Publication Data

US 2011/0212642 A1 Sep. 1, 2011

Related U.S. Application Data

(63) Continuation of application No. PCT/EP2009/006530, filed on Sep. 9, 2009.

(30) Foreign Application Priority Data

Sep. 27, 2008 (DE) .......................... 10 2008 049 232

(51) Int. Cl.
*H01R 13/62* (2006.01)

(52) U.S. Cl. ...................................................... 439/326

(58) Field of Classification Search .................. 439/326, 439/194, 196, 201, 205
See application file for complete search history.

(56) References Cited

U.S. PATENT DOCUMENTS

| 3,701,071 | A | * | 10/1972 | Landman ....................... 200/5 R |
| 3,848,952 | A | | 11/1974 | Tighe, Jr. |
| 4,136,917 | A | * | 1/1979 | Then et al. .................... 439/326 |
| 4,493,010 | A | * | 1/1985 | Morrison et al. ............. 361/698 |
| 4,832,617 | A | | 5/1989 | Brown |
| 5,057,032 | A | | 10/1991 | Kaufman et al. |
| 5,131,859 | A | | 7/1992 | Bowen et al. |
| 5,292,265 | A | * | 3/1994 | Chen et al. .................... 439/876 |
| 6,575,776 | B1 | * | 6/2003 | Conner et al. ................ 439/206 |
| 6,890,202 | B2 | * | 5/2005 | Yasufuku et al. ............. 439/331 |

FOREIGN PATENT DOCUMENTS

DE 2434628 A1 2/1975
EP 1 870 969 A1 12/2007

OTHER PUBLICATIONS

International Search Report dated Nov. 20, 2009 with English translation (four (4) pages).
German Search Report dated Jan. 30, 2012 with one page of degree of relevance (five (5) pages).

* cited by examiner

*Primary Examiner* — Edwin A. Leon
*Assistant Examiner* — Harshad Patel
(74) *Attorney, Agent, or Firm* — Crowell & Moring LLP

(57) ABSTRACT

A receiving unit is provided for a circuit board carrier, wherein the receiving unit has at least one electric contact. The circuit board carrier is insertable into the receiving unit at an angle to an end position of the circuit board carrier. The receiving unit is designed in such a manner that in an inserted state of the circuit board carrier there are in essence no bending forces that act on the circuit board carrier by way of the at least one electric contact. Furthermore, a connection system and an electric machine with such a receiving unit, as well as a motor vehicle with such a corresponding electric machine, are provided.

15 Claims, 4 Drawing Sheets

RECEIVING UNIT FOR A CIRCUIT BOARD CARRIER, CONNECTION SYSTEM, ELECTRIC MACHINE WITH RECEIVING UNIT AND MOTOR VEHICLE WITH SUCH AN ELECTRIC MACHINE

CROSS-REFERENCE TO RELATED APPLICATIONS

This application is a continuation of PCT International Application No. PCT/EP2009/006530, filed Sep. 9, 2009, which claims priority under 35 U.S.C. §119 from German Patent Application No. DE 10 2008 049 232.9, filed Sep. 27, 2008, the entire disclosures of which are herein expressly incorporated by reference.

BACKGROUND AND SUMMARY OF THE INVENTION

The invention relates to a receiving unit for a circuit board carrier, a connection system, an electric machine with such a receiving unit, and a motor vehicle with such an electric machine.

Electronic control systems for hybrid drives are constructed of function modules and include, for example, an electronic power output stage, an intermediate circuit capacitor, a control printed circuit board, a connecting region, a control unit, a cooling system and a housing.

For example, solderable connections are provided between the individual function modules. These connections are costly to make due to the relatively high driving current.

At the present time solder contacts, weld contacts or screw contacts are used for such connections, in order to connect the circuit board carrier with the electronic power components to the intermediate circuit capacitor and the connecting region by way of bus bars.

The use of bus bars between the circuit board carrier for the electronic power components and the connecting region keeps the handling forces at a distance from the circuit board carrier. The metallurgical connections are characterized by a low contact resistance with simultaneously low space requirement. Screw contacts are compact and allow a standardized handling, and plug-in contacts are easy to install.

The drawback with the metallurgical connections lies in their poor solderability and limited reliability. Screw connections, on the other hand, are associated with high assembly cost and frequent assembly errors and are sensitive to weakening contact forces. Plug-in contacts demand a lot of space and require high plug-in forces for connections with a high current carrying capacity. The pressure contact systems known from the prior art require a lot of space in order to guarantee the force closure (friction locking connection) and are susceptible to assembly errors. In addition, the oxide layers on the contact surfaces degrade contact with the circuit board carrier.

Computer technology discloses plug-in systems, in which a contact guiding printed circuit board is inserted and then clamped by tilting and snap locking (for example, for single inline memory modules (SIMM)).

The use of such plug-in systems is limited to the connection of signal lines due to the low contact forces that can be achieved. The contact surfaces must have a high quality (gold plated), in order to prevent oxidation. The technology used for single inline memory modules has the same disadvantage. In addition, this SIMM technology transmits to the circuit board carrier bending stresses that are in proportion to the contact force and, therefore, is suitable only for systems with low contact forces, that is, low current carrying capacity.

The object of the invention is to avoid the aforementioned drawbacks and to provide, in particular, a receiving unit that allows the circuit board carrier the possibility of an efficient connection with simultaneously a high current carrying capacity.

This and other objects are achieved according to the invention by providing a receiving unit for a circuit board carrier, wherein the receiving unit has at least one electric contact. The circuit board carrier is insertable into the receiving unit at an angle to an end position of the circuit board carrier. The receiving unit is designed such that in the inserted state of the circuit board carrier there are, essentially, no bending forces that act on the circuit board carrier by way of the at least one electric contact.

In particular, it is advantageous that during the insertion of the electric current into the receiving unit, the electric contact is capable of scratching open an oxide layer and, in so doing, ensures that an electric contact is produced. Furthermore, it is advantageous that in the end position of the circuit board carrier, that is, in an inserted state, contact is made with the circuit board carrier in a substantially strainless way.

Another aspect of the invention is that the receiving unit has a recess for receiving a part of the circuit board carrier.

An additional aspect of the invention is that the circuit board carrier can be inserted into the receiving unit along a guide. The guide can help to insert the circuit board carrier at an angle. In particular, it is further developed that the guide includes a guide rail and/or a guide along a housing.

In particular, the housing and/or the receiving unit itself can be constructed so as to help insert the circuit board carrier at an angle into the end position. In this way, it is also possible to efficiently provide for the breaking up of any oxide layer that might be present at the contacts.

It is also a further development that the receiving unit has a plurality of electric contacts that are provided on opposite sides of the circuit board carrier. For example, the contacts may be placed opposite each other. The contacts may also be arranged so as to be at least partially offset in relation to each other.

In this respect it must be pointed out that each contact can be dimensioned as a function of the current flowing through the contact to or from the circuit board carrier. If, for example, a high current flows through the respective contact, then this contact can be dimensioned so as to be suitably large. If the contact serves only to transmit a signal in the low voltage range, then the contact may exhibit small dimensions.

Furthermore, it is a further development that the plurality of electric contacts essentially compensate for the bending forces acting on the circuit board carrier.

In accordance with an additional further development, the opposite side of the at least one contact has a mechanical contact or an electric contact, in order to compensate for the bending forces acting on the circuit board carrier in the inserted state.

In particular, electric or mechanical contacts that are located opposite each other in the end position of the circuit board carrier in the receiving unit lie essentially perpendicular to a conductor track contact surface.

In this respect it must be pointed out that the strainless positioning of the circuit board carrier can also be achieved by means of mechanical contacts. For example, a mechanical contact can be provided by the receiving unit or by means of a housing.

A next further development consists of the fact that the contact is a spring contact. In this case, a wide variety of variations or rather any variation of spring contacts—mechanical and/or electric in nature—are possible.

In one embodiment the receiving unit has a locking mechanism. The locking mechanism serves, in particular, to retain the circuit board carrier in the receiving unit.

An alternative embodiment consists of the fact that the circuit board carrier can be cooled by way of cooling fluid. For example, the cooling fluid may be a coolant or a fluid of the surroundings.

In another embodiment, the circuit board carrier has at least one connection for supplying and/or draining the cooling fluid. In particular, the interior of the circuit board carrier can have a meandering shaped line structure comprising an inflow and an outflow, through which the cooling fluid can flow. It is also an embodiment that the at least one connection for supplying and/or draining the coolant can be combined with the insertion of the circuit board carrier into the receiving unit.

A further development consists of the fact that the at least one electric contact is a contact of a signal line and/or a current line.

It is an additional embodiment that the at least one electric contact is connected to an electric machine. In that regard, the term "electric machine" is defined, in particular, as any electric machine that uses an electromagnetic operating principle. In particular, the electric machine can include an electric motor and/or a generator.

According to the invention, a connection system is provided, which includes the receiving unit described herein and a circuit board carrier for insertion into and/or being received in the receiving unit. Additionally, an electric machine according to the invention is provided that includes at least one receiving unit, as described herein. Still further, a motor vehicle according to the invention is provided with an electric machine as described herein.

Other objects, advantages and novel features of the present invention will become apparent from the following detailed description of one or more preferred embodiments when considered in conjunction with the accompanying drawings.

DETAILED DESCRIPTION OF THE DRAWINGS

The present approach allows a circuit board carrier comprising, in particular, electronic power components, to be connected to a connecting region by way of plug-in/pressure contacts. This approach allows a number of contacts, through which the current flows, to be reduced. Preferably the external elements of the plug-in/pressure contact absorb the handling forces and prevent these forces from being transmitted to the circuit board carrier. For circuits with large currents, the circuit board carrier can be made of ceramic. In this respect the contacts on the circuit board carrier are constructed preferably as conductor tracks of the circuit board carrier, but can be reinforced by means of contact materials that are additionally applied thereon.

Figure 1:
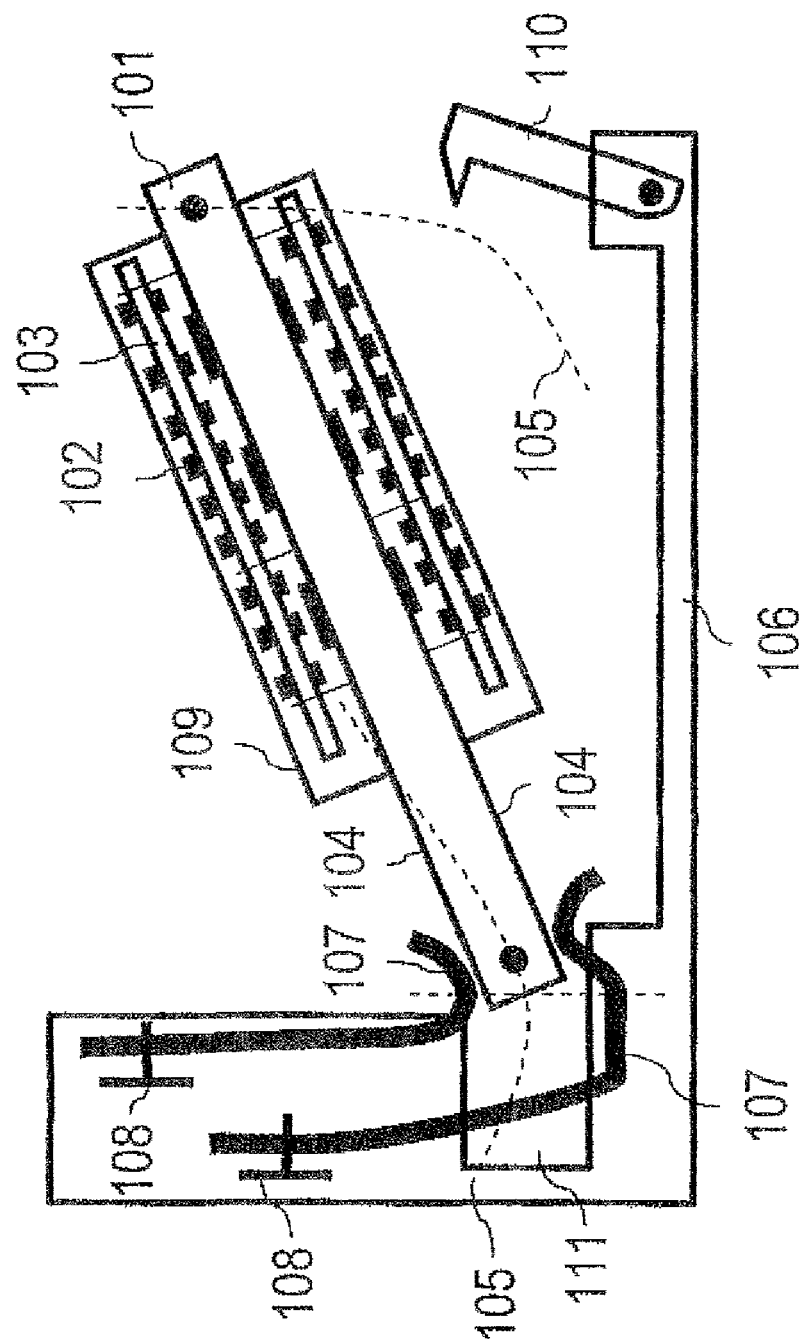
FIG. 1 is a schematic diagram showing a receiving unit for receiving a circuit board carrier and for connecting conductor track contacts of the circuit board carrier with plug-in/pressure contacts of a connecting region.

FIG. 1 shows an arrangement, in particular a receiving unit 106, for receiving a circuit board carrier 101 and for connecting the conductor track contacts 104 of the circuit board carrier 101 to plug-in/pressure contacts 107 of a connecting region 108.

The circuit board carrier 101 is, in particular, an electronic power circuit board carrier comprising printed circuit boards 103 with components 102. The electric components 102 and 103 of the circuit board carrier 101 may be provided (like the circuit board carrier 101 itself) with an electric and/or mechanical protection 109.

The plug-in/pressure contacts 107 are constructed such that, when the circuit board carrier 101 is inserted at an angle (obliquely), there is initially no contact force (or hardly any contact force) acting on the circuit board carrier 101. The contact force does not begin to act until near the end of the insertion process of the circuit board carrier 101, and is produced by tilting the circuit board carrier 101 against the plug-in/pressure contacts 107. Preferably, the circuit board carrier 101 can still be inserted completely into a recess 111 with the application of the plug-in force.

This approach makes it possible to effectively prevent the circuit board carrier 101 from being damaged (for example, by breaking the edges) and to reduce the plug-in force itself.

A final sliding motion of the circuit carrier board 101 into the recess 111 moves the conductor track contacts 104 between the plug-in/pressure contacts 107 and, in so doing, allows any oxide layer that may be present on the contacts to be scratched open (off), as a result of which an electric contact is produced.

Preferably the circuit board carrier 101 is guided along a guide track 105, for example, over a rail in relation to the plug-in/pressure contacts 107. Then, when finally in the plug-in position, the circuit board carrier 101 is retained in relation to the contact system by way of a locking mechanism 110. The locking mechanism 110 may include, for example, a screw, a spring, a wedge or a pawl.

Figure 2:
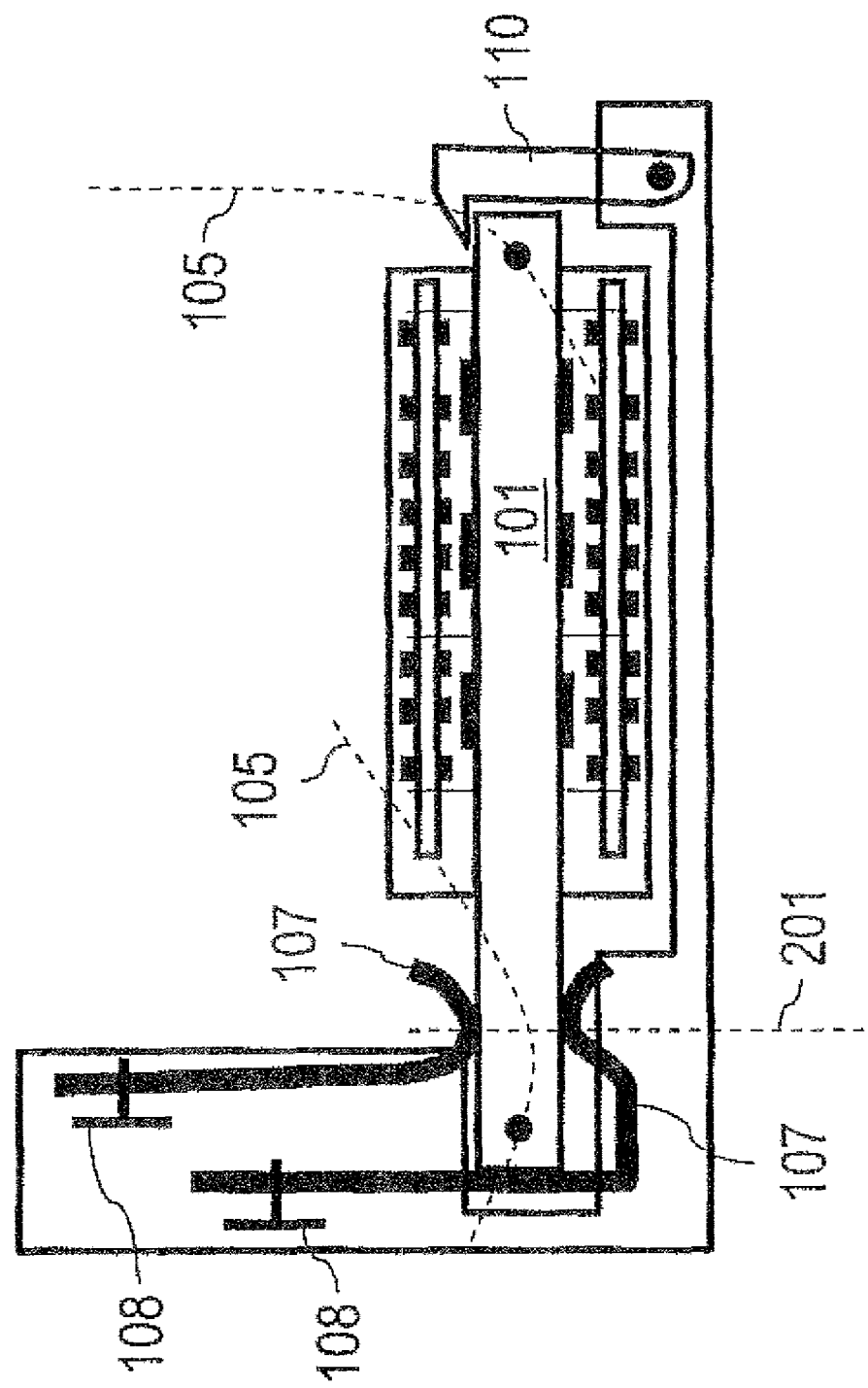
FIG. 2 shows, based on the drawing from FIG. 1, the circuit board carrier that is retained between the plug-in/pressure contacts.

FIG. 2 shows, based on the drawing from FIG. 1, the circuit board carrier 101 that is retained between the plug-in/pressure contacts 107. The reference numerals correspond to the reference numerals according to FIG. 1.

The cross section of the plug-in/pressure contact 107 and its anchoring and/or the guide are dimensioned, in particular, such that a stiffening of the contact 107 provides the spring characteristic that is necessary for a reliable electric connection without thereby adversely affecting the stability of the circuit board carrier 101. The cross section of the contact 107 can vary over its length.

In one embodiment, the contact 107 can be constructed in such a way that as the circuit board carrier 101 is inserted further and further, the relative positions between the top and the bottom contact element shift in relation to each other, so that a predetermined maximum bending stress of the circuit board carrier 101 is not exceeded when it is inserted into the receiving unit 106, and, when the circuit board carrier 101 is in the completely inserted state, the force axes of the contacts 107 are located in essence on a common perpendicular 201 in relation to the front and rear side of the circuit board carrier 101. In this way the bending stress of the circuit board carrier 101 is essentially neutralized by the contact system.

A plurality of single contacts or, more specifically contacts with a plurality of laminations, are used for a high current carrying capacity and a high reliability. A plurality of plug-in/pressure contacts that are insulated from each other may be provided for the various connections of the circuit board carrier 101 (plus, minus, motor phases, intermediate circuit capacitor, filter inductance and/or filter capacitance, brake chopper, etc.).

Figure 3:
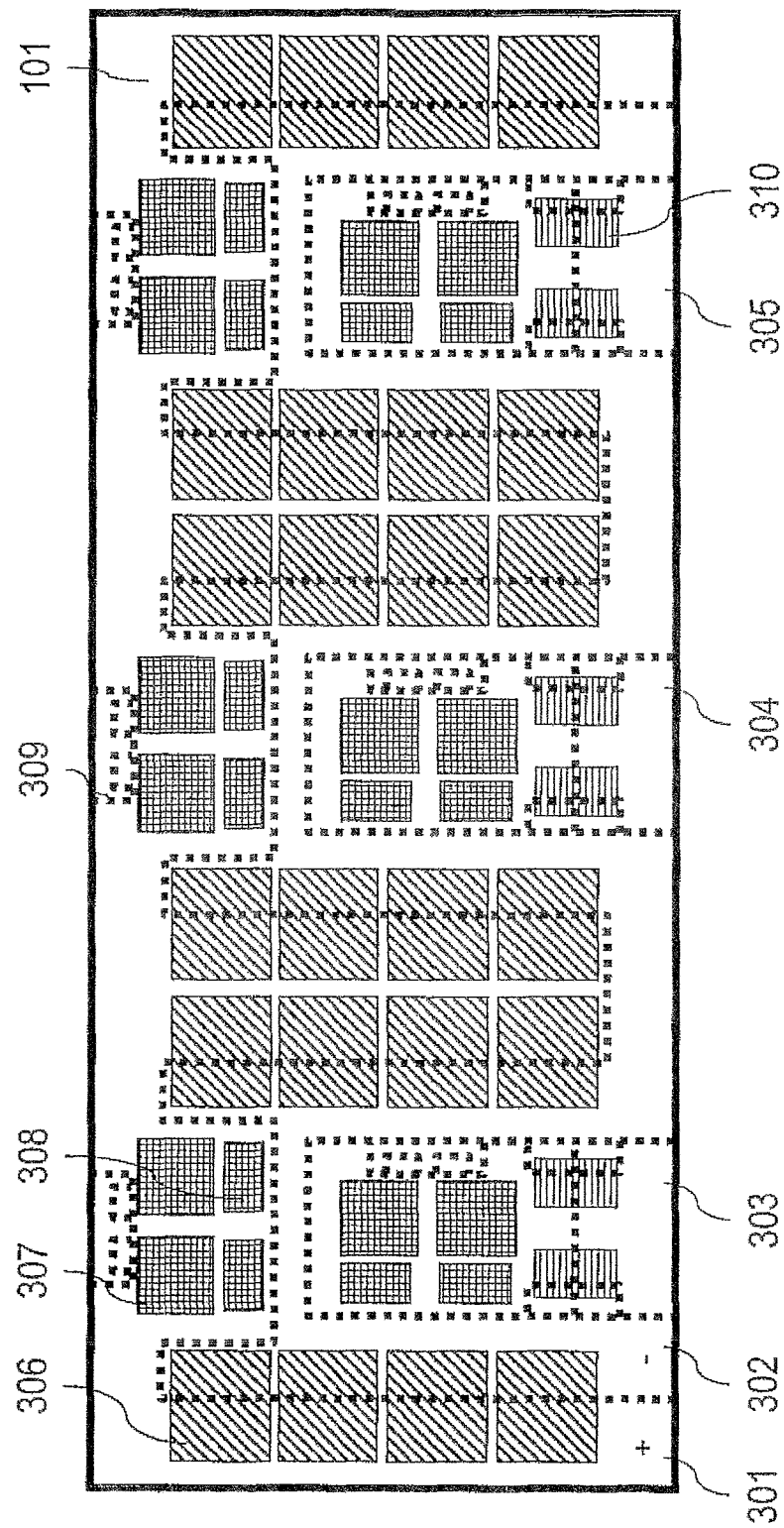
FIG. 3 is a side view of a circuit board carrier (substrate with conductor tracks) having connections for a direct current source and phase connections, wherein, furthermore, the circuit board carrier has capacitors, transistors, diodes and current sensors.

FIG. 3 is a side view of a circuit board carrier 101 (substrate with conductor tracks) having connections 301, 302 for a direct current source and phase connections 303, 304, and 305. Furthermore, the circuit board carrier 101 according to FIG. 3 has capacitors 306, transistors 307, diodes 308 and current sensors 310. Furthermore, there are etched trenches 309.

It is advantageous that the force closure (friction locking connection) of the contact system with the low space requirement takes place at the edge of the circuit board carrier 101 over the front and rear side of the circuit board carrier 101. For adequate electric insulation between the connections, the contact surfaces of the circuit board carrier 101 can be constructed so as to be set back in relation to the end side. The electric insulation of the plug-in/pressure contacts 107 can be achieved by a mechanical carrier of the contacts. In this case the contact system can be configured so as to make a unilateral, bilateral or mixed or asymmetrical contact with the circuit board carrier 101. The opposing front and rear sided contacts can be assigned the identical or different potentials. The contacts 107 may represent power connections and/or signal connections. The single contacts can be adjusted with respect to their contact force to the current carrying capacity of the respective contact 107. In this case it is advantageous if the contact force of the contact 107 has, on the one hand, the shortest possible path and, on the other hand, a suitable force closure.

In an additional embodiment the circuit board carrier 101 is stiffened (for example, by use of an additional board) on the underside or between the two circuit board surfaces. The additional stiffening enables high contact forces and, thus, contacts with a high current carrying capacity.

The stiffening can also be used for cooling the circuit board carrier 101, in particular, the contacts, like the circuit disposed on the circuit board carrier. Correspondingly the contact system may be dimensioned so as to save material.

It is also a possibility to supply or drain a cooling medium by way of inlets and outlets (for example, with ventilating openings, fittings and hoses, etc.) that are attached over the top areas, side areas or end areas of the circuit board carrier 101.

Figure 4:
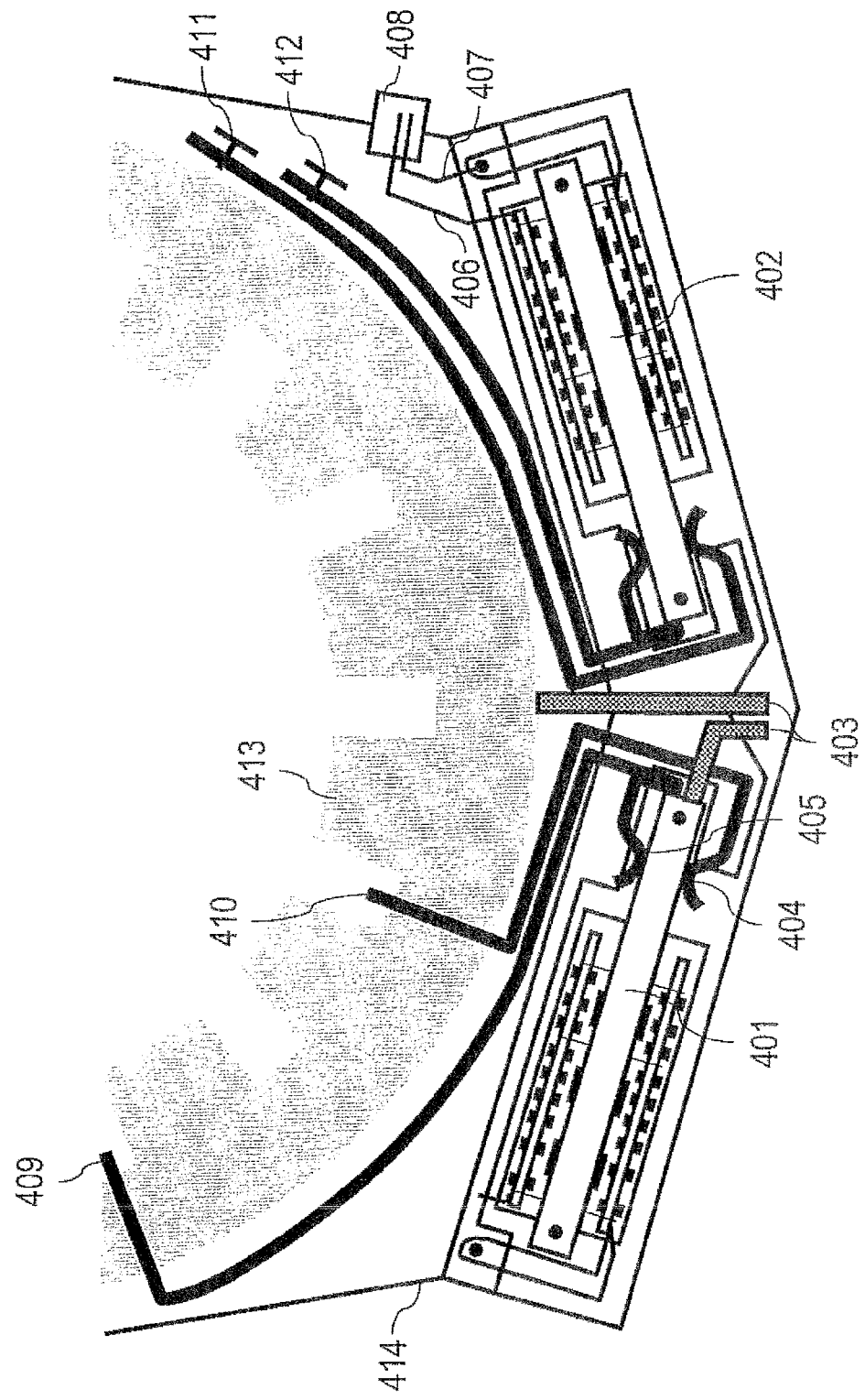
FIG. 4 shows one example for making contact with two circuit board carriers in a transmission housing.

FIG. 4 shows one example for making contact with two circuit board carriers 401, 402 in a transmission housing 414. In this case the circuit board carrier 401 has one connection 403 for supplying (or for draining) a coolant or a cooling fluid.

It is an additional possibility to integrate the supply or drainage of the coolant into the plug-in/pressure contact system (for example, by means of O-ring radial seals). This arrangement makes it possible to combine the connection 403 and the contacts 404, 405 into one single working step during the assembly of the circuit board carrier 401.

Furthermore, it is possible to integrate additional connections for the signal lines (for example, CAN, etc.) into the plug-in/pressure contact system. This feature can be implemented, for example, in the form of a plug that utilizes the tilting motion of the circuit board carrier that is to be inserted in such a way that contact is made with the connections of the signal lines by means of the plug-in process.

Additional connections for lines that require relatively small contact forces (for example, signal lines) and/or cooling lines can be integrated into a carrier frame or, more specifically, into the locking mechanism of the inserted circuit board carrier. In this case it is also possible that a locking force engages with an additional circuit board carrier (for example, driver printed circuit board and/or control printed circuit board) that is connected at least in a force closed manner to the electronic power circuit board carrier.

In this respect FIG. 4 shows, by way of example, the signal contacts 406 and 407 that are run to a control connection 408.

Furthermore, the circuit board carrier may be a part of the integrated electric drive with a stator 413, and the contact system may be connected to the phase connections 409, 410 of the electric machine at least to some extent without any additional intermediate contacts, so that at least that part of the connecting regions that is named for the connection of the phase connections may be dropped from the contact system and the electric machine. Correspondingly it is also possible that a connection is produced by means of the connecting regions 411 and 412.

Furthermore, the mechanical carrier of the connecting system and the electronic devices as well as the connections for cooling can be constructed together with the mechanical parts of the motor (for example, stator sheet core, stator carrier, housing, etc.).

Furthermore, the integrated electric drive may be a part of a hybrid drive and may be cooled, for example, by way of the transmission oil.

The proposed contact technique for the circuit board carrier offers, in particular, the advantage of a detachable connection between the circuit board carrier as the electronic power component and the connecting region. Furthermore, essentially no handling forces are impressed on the circuit board carrier. Moreover, there is also a short and efficient force closure. This approach enables a high degree of reliability, low material cost, small number of parts and reduced assembly effort.

Furthermore, the proposed approach makes it possible to separate the electronic technology from the electromechanical technology and, in so doing, simplifies the production of the system. A simple system integration by use of a modular and functional construction principle is also possible.

Finally the proposed connection system takes up only a small amount of space and, thus, supports a cost optimized use.

| Table of Reference Numerals | |
|---|---|
| 101 | circuit board carrier, in particular an electronic power circuit board carrier |
| 102 | component(s) |
| 103 | printed circuit board, in particular, a control printed circuit board or driver printed circuit board |
| 104 | conductor track contact |
| 105 | guide track (for the circuit board carrier) |
| 106 | receiving unit (for example, frame) |
| 107 | contact, in particular plug-in/pressure contact |
| 108 | connecting region |
| 109 | electric and/or mechanical protection |
| 110 | locking mechanism |
| 111 | recess |
| 201 | line for contact force for inserted circuit board carrier 101 |
| 301 | connection (+) pole |
| 302 | connection (−) pole |
| 303 | phase connection |
| 304 | phase connection |
| 305 | phase connection |
| 306 | capacitor |
| 307 | transistor |
| 308 | diode |
| 309 | etched trench |

-continued

Table of Reference Numerals

| | |
|---|---|
| 310 | current sensor |
| 401 | circuit board carrier |
| 402 | circuit board carrier |
| 403 | connection (for supplying and/or draining a coolant or a cooling fluid) |
| 404 | contact |
| 405 | contact |
| 406 | signal contact |
| 407 | signal contact |
| 408 | control connection |
| 409 | phase connection |
| 410 | phase connection |
| 411 | connecting spring |
| 412 | connecting spring |
| 413 | stator |
| 414 | transmission housing |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A receiving unit for a circuit board carrier, comprising:
at least one electric contact of the receiving unit;
wherein the receiving unit is operatively configured such that the circuit board carrier is insertable into the receiving unit at an angle to an end position of the circuit board carrier in the receiving unit; and
wherein the receiving unit is further operatively configured such that during insertion of the circuit board carrier at the angle essentially no bending forces act on the circuit board carrier by way of the at least one electric contact, wherein the receiving unit is operatively configured to provide cooling via a cooling fluid for the circuit board carrier in the inserted state.

2. The receiving unit according to claim 1, further comprising a recess formed in the receiving unit, the recess being operatively configured to receive at least a portion of the circuit board carrier in the end position of the circuit board carrier in the receiving unit.

3. The receiving unit according to claim 1, wherein the receiving unit is operatively configured to receive the circuit board carrier insertable therein along a guide.

4. The receiving unit according to claim 3, wherein the guide comprises at least one of a guide rail and a housing or receiving unit guide.

5. The receiving unit according to claim 1, wherein the receiving unit comprises a plurality of electric contacts provided for opposite sides of the circuit board carrier.

6. The receiving unit according to claim 5, wherein the plurality of electric contacts are operatively configured to essentially compensate for bending forces acting on the circuit board carrier along a common perpendicular plane when the circuit board carrier is in a completely inserted state.

7. The receiving unit according to claim 1, wherein the at least one electric contact is a spring contact.

8. The receiving unit according to claim 1, further comprising a locking mechanism for locking the circuit board carrier in the receiving unit.

9. The receiving unit according to claim 1, wherein the circuit board carrier comprises at least one connection for at least one of supplying and draining the cooling fluid.

10. The receiving unit according to claim 9, wherein said at least one connection is made in combination with the insertion of the circuit board carrier into the end position in the receiving unit.

11. The receiving unit according to claim 1, wherein the at least one electric contact is at least one of a signal line contact and a current line contact.

12. The receiving unit according to claim 1, wherein the at least one electric contact is operatively configured for coupling to an electric machine.

13. A connection system, comprising:
a circuit board carrier;
a receiving unit for the circuit board carrier;
at least one electric contact of the receiving unit;
wherein the receiving unit is operatively configured such that the circuit board carrier is insertable into the receiving unit at an angle to an end position of the circuit board carrier in the receiving unit; and
wherein the receiving unit is further operatively configured such that during insertion of the circuit board carrier at the angle essentially no bending forces act on the circuit board carrier by way of the at least one electric contact, wherein the receiving unit is operatively configured to provide cooling via a cooling fluid for the circuit board carrier in the inserted state.

14. An electric machine, comprising:
a circuit board carrier having electrical power components for the electrical machine;
a receiving unit for the circuit board carrier;
at least one electric contact of the receiving unit;
wherein the receiving unit is operatively configured such that the circuit board carrier is insertable into the receiving unit at an angle to an end position of the circuit board carrier in the receiving unit; and
wherein the receiving unit is further operatively configured such that during insertion of the circuit board carrier at the angle essentially no bending forces act on the circuit board carrier by way of the at least one electric contact, wherein the receiving unit is operatively configured to provide cooling via a cooling fluid for the circuit board carrier in the inserted state.

15. A motor vehicle, comprising:
an electric machine;
at least one circuit board carrier for electrical power components for the electrical machine;
at least one receiving unit, each receiving unit accommodating a respective circuit board carrier;
wherein the at least one receiving unit comprises:
at least one electric contact of the receiving unit;
wherein the receiving unit is operatively configured such that the respective circuit board carrier is insertable into the receiving unit at an angle to an end position of the circuit board carrier in the receiving unit; and
wherein the receiving unit is further operatively configured such that during insertion of the respective circuit board carrier at the angle essentially no bending forces act on the circuit board carrier by way of the at least one electric contact, wherein the receiving unit is operatively configured to provide cooling via a cooling fluid for the circuit board carrier in the inserted state.

* * * * *